July 10, 1962 — W. L. TAYLOR — 3,043,328

PNEUMATIC SELECTION SYSTEM

Filed March 6, 1959 — 3 Sheets-Sheet 1

INVENTOR.
WESLEY L. TAYLOR

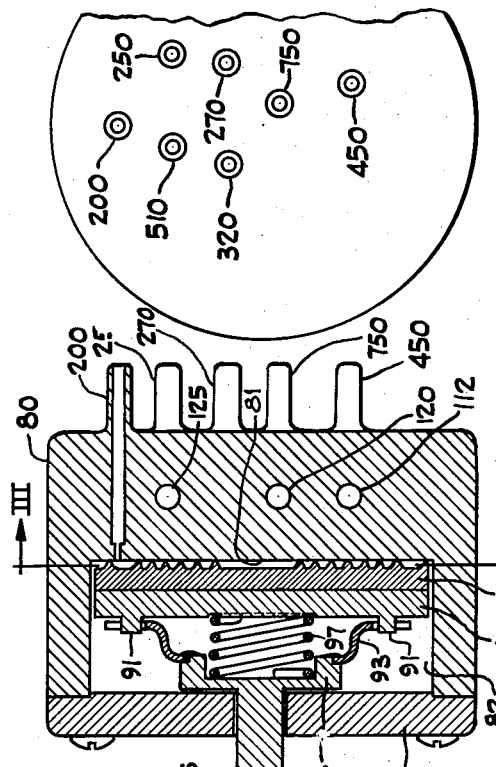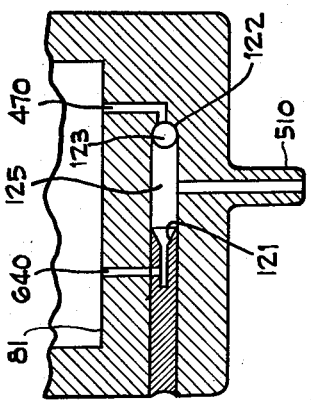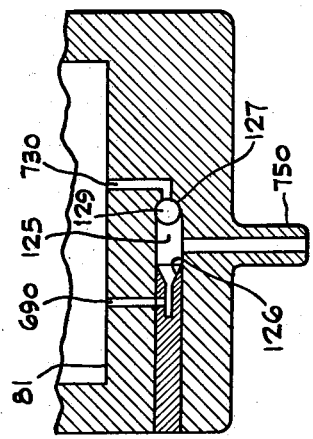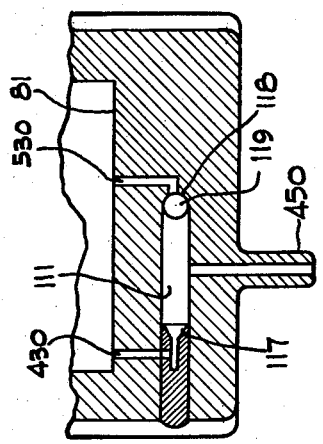

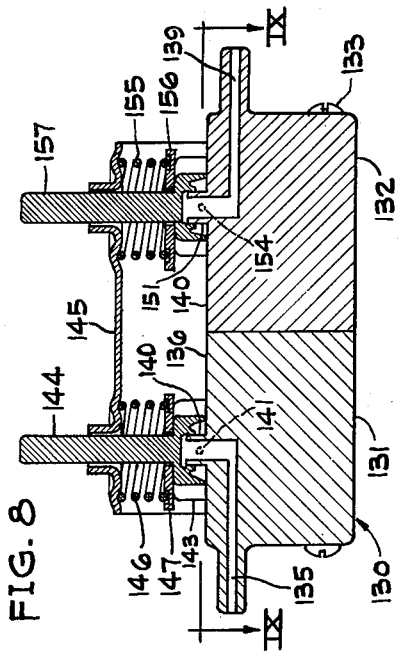

United States Patent Office 3,043,328
Patented July 10, 1962

3,043,328
PNEUMATIC SELECTION SYSTEM
Wesley L. Taylor, Glenview, Ill., assignor to The Dole Valve Company, Morton Grove, Ill., a corporation of Illinois
Filed Mar. 6, 1959, Ser. No. 797,716
4 Claims. (Cl. 137—112)

This invention relates to improvements in pneumatic control systems for washing machines and the like and more particularly relates to an improved system in which various washing programs may be preselected in accordance with the fabric to be washed.

A principal object of the invention is to provide a simple and improved form of fluid operated control system for washing machines and the like, in which the washing program may be preselected for various types of fabrics to be washed and in which the preselected program may be overridden at the selection of the operator of the machine.

A further object of the invention is to provide a pneumatic control system for washing machines and the like, in which pneumatic motors control the delivery of water at selected temperatures for the washing and rinsing operations, in which a programming valve means is provided to preselect the temperature of the water for the washing and rinsing operations and in which automatic valve means in association with the programming valve means is provided to accommodate the overriding of any preselected program at the will of the operator.

A still further object of the invention is to provide an efficient form of pneumatic control system for controlling the washing operations of a washing machine and the like, in which a series of program selector valves are provided to preselect the washing temperatures for the washing and rinsing operations and to preselect the washing speed in accordance with the fabric to be washed, wherein the temperatures of the water supplied for the washing and rinsing operations and the speed of the agitator for washing and the speed of the clothes container for spinning are controlled by individual pneumatic motors under the control of the program selector valve means, in which pressure operated valve means are provided to assure operation of a selected pneumatic motor under the control of the programming valve means, and in which the program valve means vents the pneumatic motors to atmosphere in cooperation with the pressure operated valve means, upon a change in the program to accommodate the overriding of a selected program, while a washing operation is being carried out.

These and other objects of the invention will appear from time to time as the following specification proceeds and with reference to the accompanying drawings wherein:

FIGURE 1 is a fragmentary fluid diagram showing the timer valves controlling the temperature of the water filling the tub for the washing and rinsing operations and for controlling operation of the agitator and spinning of the clothes container, and showing the timer valves connected with a pneumatic programmer constructed in accordance with one form of the invention, for preselecting the programs for washing and rinsing;

FIGURE 2 is a sectional view taken through a pneumatic programmer constructed in accordance with the invention;

FIGURE 3 is a sectional view taken substantially along line III—III of FIGURE 2;

FIGURE 3a is an end view of the rotatable shear valve.

FIGURE 4 is an end view of the programming valve showing the inlets and outlets to the valve body;

FIGURE 5 is a fragmentary sectional view taken substantially along lines V—V of FIGURE 3;

FIGURE 6 is a fragmentary sectional view taken substantially along line VI—VI of FIGURE 3;

FIGURE 7 is a fragmentary sectional view taken substantially along line VII—VII of FIGURE 3;

FIGURE 8 is a longitudinal sectional view taken through a modified form of programming valve constructed in accordance with the invention;

FIGURE 9 is a vertical sectional view taken substantially along line IX—IX of FIGURE 8;

FIGURE 10 is a transverse sectional view taken substantially along line X—X of FIGURE 9;

FIGURE 11 is a fragmentary transverse sectional view taken substantially along line XI—XI of FIGURE 9; and FIGURE 12 is an end view of the program selector valve with certain parts thereof broken away and certain other parts shown in section.

Figure 1:
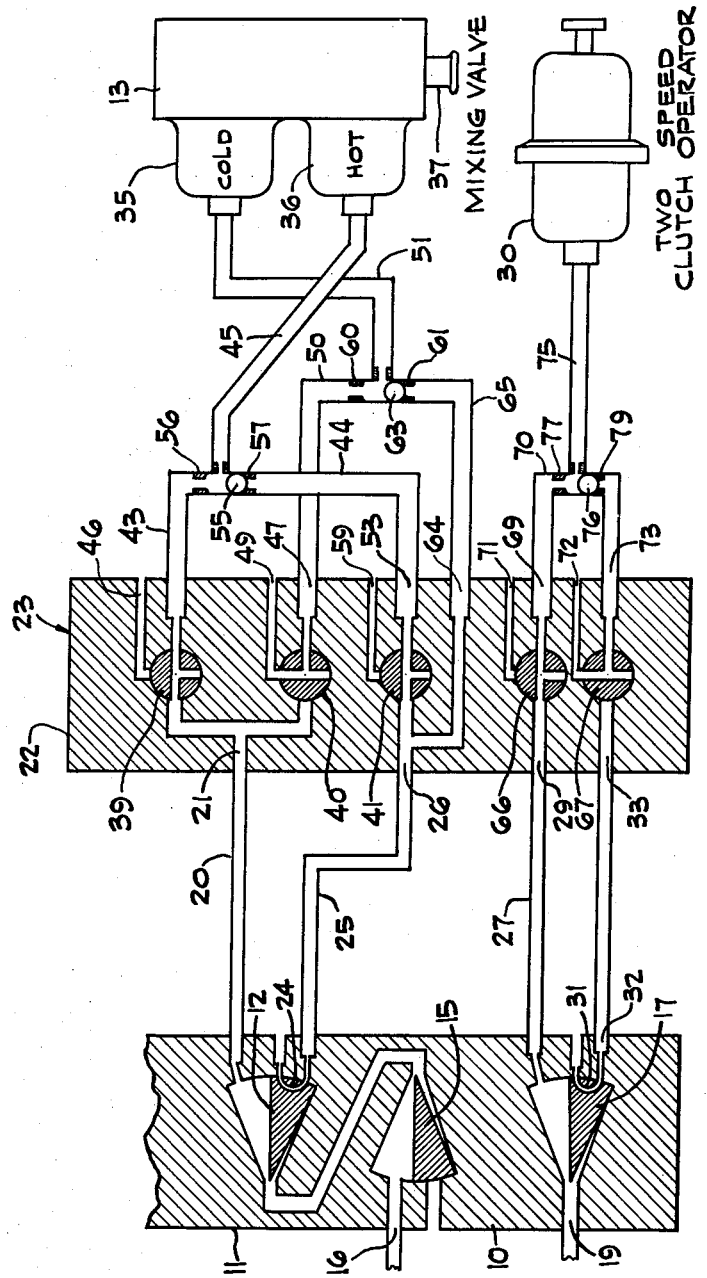

In the embodiment of the invention illustrated in FIGURE 1 of the drawings, I have diagrammatically shown a portion of a pneumatic control system for a washing machine and the like controlling the temperature of the water and the speed of washing and rinsing in accordance with the principles of the present invention, and somewhat similar to the pneumatic control system shown in my joint application with Carl C. Bauerlein, Serial No. 733,520, filed May 7, 1958 and entitled "Pneumatic Control System for Washing Machines and the Like" and now Patent No. 2,960,856.

The present invention relates only to the programming of the water temperatures and the agitator and spin speeds for the washing and rinsing operations, the balance of the system being like that shown and described in the aforementioned application, Serial No. 733,520, so not herein shown or described further.

In the form of the invention illustrated in FIGURE 1, I have diagrammatically shown a portion of a timer 10, driven by the usual timer motor (not shown) and including a manifold 11 having a wash-rinse timer valve 12 therein, controlling the supply of fluid under pressure, such as air to control operation of a mixing valve 13 during the washing and rinsing operations. The manifold 11 also has a valve 15 therein controlling the supply of fluid under pressure to the wash-rinse valve 12 and venting said valve to atmosphere when a pressure line 16 entering said manifold is closed. The manifold 11 also has a speed control valve 17 therein, controlling the speed of the agitator (not shown) of the washing machine and the speed of spinning of the clothes container during the rinsing and extracting operations. The speed control valve 17 is connected with a source of fluid under pressure through a pressure line 19.

The wash rinse valve 12 is shown in FIGURE 1 in its wash position and when in this position and the valve 15 is opened to supply fluid under pressure to the wash rinse valve 12, the valve 12 will supply fluid under pressure to a wash pressure line 20, having connection with a wash port 21 leading into a valve body 22 of a program selector valve 23. Fluid under pressure is thus supplied to the program selector valve 23 to control the temperature of the water delivered by the mixing valve 13 in accordance with the position of the program selector valve 23.

The wash rinse valve 12 has a vent passageway 24 therein, and when the valve is in the wash position shown, said vent passageway vents a rinse pressure line 25 to atmosphere. The rinse pressure line 25 is connected with a rinse port 26 in the valve body 22 for supplying fluid under pressure to the program selector valve to control the temperature of the water delivered by the mixing valve 13 for the rinse operation.

When the wash rinse valve 12 is in its rinse position the wash pressure line 20 is vented to atmosphere through the vent passageway 24 of the valve 12. Fluid under pressure is then supplied to the programming selector valve 23 through the rinse pressure line 25.

The speed control valve 17, when in the wash position shown in FIGURE 1, supplies fluid under pressure to the program selector valve 23 through a pressure line 27 communicating with an inlet port 29 leading into the valve body 22 and supply fluid under pressure to the program selector valve 23 to operate a pneumatic or fluid operated motor 30. The pneumatic motor 30 may be of a well known form, operated in one direction by pressure and returned by a spring upon the release of pressure from the motor. The pneumatic motor 30 may serve to operate a clutch (not shown) upon the admission of air under pressure to the motor, to effect a high speed drive to the agitator of the washing machine for washing and a high speed spin to the clothes container during rinsing and extracting, and upon the release of air under pressure from the motor 30, to release the clutch to effect a low agitator and spin speed in a manner well known to those skilled in the art, so not herein shown or described further.

The valve 17 has a vent passageway 31 therein venting a spin control pressure line 32 to atmosphere when said valve is in the agitator control position shown in FIGURE 1. The spin control pressure line 32 in turn has communication with the body 22 of the program selector valve through an inlet port 33 to supply fluid under pressure under the control of the program selector valve 23, to operate the fluid operated motor 30 to effect a high spin speed of the clothes container when the valve 17 is in a spin control position.

The valve 13 may be a well known form of mixing valve controlled by two fluid operated motors 35 and 36. Said fluid operated motors may be pneumatic motors of a well known form, operated in one direction by pressure and returned by a spring.

Operation of the pneumatic motor 35 by connecting said motor to a source of pressure through the program selector valve 23, will effect the delivery of cold water through an outlet 37 of the mixing valve. In a like manner, operation of the pneumatic motor 36 by connecting said motor to a source of pressure through the program selector valve 23 will effect the delivery of hot water through the discharge outlet 37 from the valve.

Operation of the two fluid motors 35 and 36 under control of the program selector valve 23, will effect the delivery of tempered water through the discharge outlet 37 from the mixing valve.

The pneumatic motors 35 and 36 are operated under the control of a series of two position program selector valves 39, 40 and 41, diagrammatically shown in FIGURE 1 as being mounted in the valve block 22. The program selector valves may be of various forms, and may be operated under the control of a single knob, or may be individually operated, if desired.

In the illustrative form of my invention illustrated in FIGURE 1, the program selector valve 39 is shown as being in position to supply air under pressure from the wash inlet port 21 to a wash outlet port 43. The wash outlet port 43 has communication with a conduit 44 or passageway connected intermediate its ends to a pressure line 45. The pressure line 45 is connected with the fluid operated motor 36 to supply pressure to said motor to operate said motor to effect the delivery of hot water through the discharge outlet 37 from the mixing valve.

The valve 39 may also be moved into position to block the supply of pressure through the outlet port 43 and to vent the motor 36 and pressure line 45 to atmosphere through a vent passageway 46.

The program selector valve 40 is shown as being positioned to block the passage of fluid under pressure to a cold water outlet port 47 and to vent said outlet port to atmosphere through a vent line 49.

The cold water outlet port 47 has communication with a passageway or conduit 50 having a pressure line 51 leading therefrom, intermediate the ends of said conduit, and having connection with the fluid operated motor 35 for operating the mixing valve 13 to deliver cold water through the discharge outlet 37.

The program selector valve 41 is shown in FIGURE 1 as being in position to afford communication from the rinse inlet port 26 to a rinse outlet port 53 connected with the conduit 44 at the opposite end thereof from the wash outlet port 43.

It may be seen from FIGURE 1, that when the valves 39 and 41 are in the positions shown, that the valve 39 will supply fluid under pressure to the fluid operated motor 36, while the valve 41 will vent pressure to atmosphere through the vent passageway 24 in the wash rinse valve 12. In order to avoid the venting of the pressure line 45 to atmosphere when the valve 39 is in position to operate the fluid operated operator 36, and the valve 41 is in position to connect the outlet port 53 to vent, a pressure operated valve 55 is provided in the conduit 44 and is operated by the differential in pressure between the ports 43 and 53, to override the vent position of the wash rinse valve 12 and to supply fluid under pressure to the pressure line 45 when either of the valves 39 or 41 are in their pressure positions and pressure is supplied by the wash rinse valve to either of the ports 21 or 26.

The pressure operated vent override valve 55 may be of any well known form and is herein diagrammatically shown as being in the form of a ball in the conduit 43 seating against either one of two spaced and aligned seats 56 and 57 in the conduit 44. Thus, when the program selector valves 39 and 41 are in the position shown in FIGURE 1, the ball 55 will be moved by fluid under pressure in the outlet port 43 into engagement with the seat 57, to block the venting of the pressure line 45, and to effect the supply of fluid under pressure to the fluid operated operator 36.

When the wash rinse valve 12 is in its rinse position, venting the wash pressure line 20 to atmosphere, and the valves 39 and 41 are in the positions shown in FIGURE 1, the differential in pressure in the outlet ports 43 and 53 will force the valve 55 into engagement with the seat 56, to effect the supply of fluid under pressure to the fluid operated operator 36 through the valve 41. The valve 41 also has a vent position, and when turned in position to block the passage of fluid under pressure through the port 53, the port 53 and pressure line 45 will be vented to atmosphere through a vent passageway 59.

The conduit 50 also has spaced seats 60 and 61 therein on opposite sides of the pressure line 51, and forming seats for a pressure operated ball valve 63. When the wash rinse valve is in the wash position shown and the valve 40 is moved into position to effect the supply of air under pressure from the wash port 21 to the outlet port 47, the valve 63 will be moved into engagement with the seat 61. This will accommodate the passage of fluid under pressure to the fluid operated operator 35, to effect the delivery of cold water through the discharge outlet 37 for the mixing valve, assuming the valve 39 is turned to its vent position. It will also effect the delivery of mixed water through the discharge outlet 37, when the valve 39 is in the position shown in FIGURE 1.

During the rinsing operation, fluid under pressure may be supplied through the rinse inlet port 26, the program selector valve 41, the conduit 44 to seat the valve 55 on the seat 56 and effect operation of the fluid operated operator 36. Fluid under pressure may also be supplied through the valve block 22 and a port 64 to a pressure line 65, communicating with the opposite end of the conduit 50 from the wash pressure line 47. When the valve 12 is in its rinse position and pressure is supplied to the inlet port 26 through the rinse pressure line 25, fluid under pressure entering the conduit 50 from the pressure line 65 will move the valve 63 into engagement with the seat 60, to block the venting of the pressure line 51 through the vent outlet 49, and to supply fluid under pressure through the pressure line 51 to the fluid operated operator 35. The fluid operated operators 35 and 36 will thus be operated together, to effect the discharge of tempered water through the discharge outlet 37.

It may be seen from the foregoing that when fluid under pressure is supplied through the wash pressure line, that the rinse pressure line is vented to atmosphere, that each valve 39, 40 and 41 has a pressure supply position and an off position and vents the respective pneumatic motor to atmosphere when passing to the off position, and that automatically operated pressure operated valves are provided in the supply lines to the fluid operated operators operated by the differential in pressure between the wash pressure line and the rinse pressure line to override the vent through one pressure line when the other pressure line is supplied with fluid under pressure.

Thus, when one program has been selected, and during the washing operation or the rinsing operation, the operator desires to override the selected program and select a different program, it is merely necessary to shift the valves 39, 40 and 41 to the new selected position. As the valves are moved to the new selected position, the pressure lines 45 and 51 will both be vented to atmosphere, accommodating return of the fluid operated operators by the bias of the return springs thereof (not shown) and conditioning the fluid operated operators 35 and 36 for the new program selected.

With the arrangement just described, all possibility of locking either of the fluid operated operators 35 or 36 by pressure in the pressure supply lines thereto is obviated, thus making it possible for the operator to override any preselected program at will, and preselect a new program during any period of the washing or rinsing operation.

The program selector 23 also has speed control valves 66 and 67 in the manifold 22, communicating with the pressure lines 27 and 32 through the ports 29 and 33 respectively. The valve 66 has a pressure position, as shown in FIGURE 1, and when in this position supplies fluid under pressure through an outlet port 69 to a conduit 70. The valve 66 also has a vent position and when in this position vents the outlet port 69 and conduit 70 through a vent 71.

The valve 67 has a vent position, as shown in FIGURE 1, and when in this position vents an outlet port 73 through a vent 72. The valve 67 also has a pressure position and when in this position supplies fluid under pressure through the outlet port 73 to the conduit 70 and pressure line 75.

The pressure line 75 leads from the conduit 70 for supplying fluid under pressure to the fluid operated motor or operator 30. The conduit 70 also has a pressure operated valve 76 therein, and valve seats 77 and 79 on opposite sides of the conduit 75, to override the vent connection of the conduit 70, upon the supply of fluid under pressure to said conduit.

When the valve 66 is in the pressure position shown in FIGURE 1, fluid under pressure will be supplied to the pressure line 69 and conduit 70 to the outlet port 75 to effect operation of the fluid operated operator, and effect a drive to the agitator of the washing machine at a high rate of speed. When the valve 66 is moved to its vent position, both of the outlet ports 67 and 73 will be vented to atmosphere and the fluid operated motor will be similarly vented, effecting a drive to the washing machine agitator at a slow rate of speed, it being understood that the valve 67 is also in the vent position shown in FIGURE 1.

During the rinsing operation the speed control valve 17 moves from the agitator control position shown in FIGURE 1 to its spin control position to vent the pressure line 27 to atmosphere and supply fluid under pressure to the spin control pressure line 32 and inlet port 33.

When the valves 66 and 67 are in the position shown in FIGURE 1, the pressure line 75 will be vented to atmosphere and the clothes container (not shown) will be spun at a slow speed.

Upon shifting of the valve 67 to its pressure position, fluid under pressure will enter the conduit 70 through the port 73 and shift the valve 76 into engagement with the seat 77. This will override a vent through the pressure line 27 and vent passageway 31 in the speed control valve 17, and will supply fluid under pressure to shift the fluid operated operator 30 to effect spinning of the clothes container at a high speed, both during the extracting and rinsing operations.

It may thus be seen that the control of the fluid operated operator 30 is like the control of the fluid operated operators 35 and 36, in that said operator is vented to atmosphere upon shifting of either or both of the program selector valves 66 or 67 to new preselected positions after a speed selection has once been made, and thereby making it possible for the operator to select a new program during either the washing or rinsing operation without locking the associated fluid operated operator in a pressure operated position.

Referring now to FIGURES 3 through 6 illustrating a form of program selector valve, that may be used in carrying out the invention, I have shown a valve body 80 having inlets 200, 250, 270 and 320 leading thereinto and opening to a plane face 81 in a valve chamber 82. The inlets 200, 250, 270 and 320 may be connected with the pressure lines 20, 25, 27 and 32 respectively, leading from the timer valves 12 and 17.

The valve body 80 also has pressure lines 450, 510 and 750 leading therefrom which may be connected with the pressure lines 45, 51 and 75 to effect operation of the pneumatic motors 36, 35 and 30 respectively.

The face 81 is sealed by and engaged by a disk valve 83 operating on the shear valve principle and having a plurality of closed stepped annular tracks 85, 87, 88 and 89, a central closed track 92 and outwardly spaced closed segmental tracks 78 and 86. The valve disk 83 may be resilient or may be made from metal and is backed up by a back-up plate 90. The back-up plate 90 has spaced lugs 91 projecting outwardly therefrom and engaged by diametrically extending arms 93 extending from a flanged inner end portion 94 of an operating shaft 95. The operating shaft 95 extends through a cover 96 for the valve chamber 83 and may be operated by a knob or the like (not shown). A spring 97 seated between a flanged portion 94 of the shaft 95 and the back-up plate 90 serves to bias the face of the valve 83 into engagement with the plane face 81 of the valve chamber 82.

The annular track 85 affords communication between the inlet 200 and an outlet port 430 when the valve disk is in the position shown in FIGURE 3, and also affords communication between the inlet 200 and an outlet port 470 when the valve disk 83 is turned to bring the segmental track 86 out of the margins of the port 470 and to register the stepped closed annular track 85 with the outlet port 470. In this position of the valve disk, the outlet 430 will be outside of the stepped annular track 85. The outlet port 430 will then be vented to atmosphere.

When the outlet port 470 is in registry with the stepped annular track 86, the outlet port 470 will be vented to atmosphere through a vent opening 99 leading through the shear valve 83 and plate 90 to atmosphere.

In a like manner, the stepped annular track 87 registers with the inlet 250 and a rinse outlet 530 to supply air under pressure to the outlet port 530 in the rinse position of the valve 12. As the valve disk 83 is turned from the position shown in FIGURE 3, the rinse outlet port 530 will register with the segmental closed annular track 78 and will be vented to atmosphere through a vent 103 leading from the face 81 through the shear valve 83 and plate 90 to atmosphere.

An outlet rinse port 640 also registers with the annular track 87 and corresponds with the passageway 64 in the programming selector valve 23, and is supplied with fluid under pressure in the rinse position of the valve 12 in all positions of the valve disk 83.

An outlet port 690 leads from the valve face 81 and registers with the stepped annular track 88 and is supplied with fluid under pressure through the inlet passageway 270 when the valve is in the position shown in FIGURE 3. As the valve disk 83 is turned, the segmental closed track 78 will register with the outlet port 690 and vent said port to atmosphere through a vent passageway 105 leading through said shear valve 83 and the plate 90.

The inlet passageway 320 supplies fluid under pressure to a stepped annular track 89 registering with an outlet port 730 when the valve is in the position shown in FIGURE 3. Turning movement of the valve disk 83 from the position shown in FIGURE 3 will register the outlet port 730 with a closed central track 92 vented to atmosphere through a passageway 110 leading through the shear valve disk 83 and plate 90.

The ports 430 and 530 lead into the valve block and are connected together by a cross-passageway 111, communicating intermediate its ends with the outlet passageway 450. The cross-passageway 111 has spaced seats 117 and 118 at opposite ends thereof, either of which seats is adapted to be engaged by a valve 119, herein shown as being in the form of a ball and engaged with its seat by the differential in pressure across opposite ends of the cross-passageway 111.

In a like manner, the passageways 470 and 640 are connected together by a cross-passageway 120 communicating with the outlet 510 intermediate its ends, and having spaced seats 121 and 122, either of which is adapted to be engaged by a ball type valve 123, by the differential in pressure at opposite ends of the cross-passageway 111.

The ports 690 and 730 are also connected together by a cross-passageway 125 having oppositely facing seats 126 and 127 therein, either of which is adapted to be engaged by a valve 129 in a form of a ball, by the differential in pressure across opposite ends of the cross-passageway 126.

Thus, with the valve disk 83 in the position shown in FIGURE 3 and the wash-rinse valve 12 in the position shown in FIGURE 1, air under pressure will be supplied to the inlet port 200 and will pass along the stepped annular track 85 to the port 430. The port 530 will be vented to atmosphere through the stepped annular passageway 87 and the port 250 vented to atmosphere through the vent passageway 24 in the wash rinse valve 12.

Air under pressure entering the port 430 will thus seat the ball 119 on the seat 118. The ball will thus be held against the seat by the differential in pressure between the ports 430 and 530. Air under pressure will then be supplied through the pressure port 450 to operate the fluid operated operator 36, to effect the discharge of hot water through the outlet 37 from the mixing valve.

As the washing cycle advances to the rinse portion of the cycle, the wash rinse timer valve 12 will move into its rinse position and vent the passageway 20 through the vent passageway 24 and supply fluid under pressure to the rinse pressure line 25 and the rinse port 250. The wash outlet port 430 will then be vented to atmosphere through the port 200. Fluid under pressure will be supplied through the inlet port 250 to the outlet ports 530 and 640. Fluid under pressure in the port 530 will move the ball 119 into engagement with the seat 117, to effect the supply of fluid under pressure to the outlet port 450 through the port 530. The port 640 will then be pressurized through the inlet port 250, while the port 470 will be vented to atmosphere through the vent 99.

The ball 123 will then be moved into engagement with the seat 122, to supply fluid under pressure through the outlet port 510. The fluid operated operators 36 and 35 will then be pressurized to effect the supply of tempered water through the discharge outlet 37 from the valve 13.

In a similar manner, the ball 127 will be seated against the seat 110 during the washing operation and against the seat 126 during the rinsing operation, assuming the speed control timer valve 17 is in the position shown in FIGURE 1 to supply fluid under pressure to the port 270 during washing and to vent the port 320 during the same operation, and will move into its rinse position during rinsing, to supply fluid under pressure to the port 320 and to vent the port 270 during rinsing. This will effect the supply of fluid under pressure through the port 690 to the fluid operated operator 30 during washing, to effect a drive to the agitator (not shown) at a high speed during washing and will effect the supply of fluid under pressure through the port 750 during rinsing to effect a drive to the clothes container (not shown) to drive the clothes container at a high speed during rinsing.

When, however, it is desired to effect the drive to the agitator and the clothes container at low speeds during the washing and rinsing operations, the valve disk 83 is moved into position to vent the ports 690 and 730 to atmosphere both during the washing and rinsing operations.

It should here be understood that the valve disk 83 may be moved into position to supply hot water for washing, warm water for rinsing and high agitator and spin speeds for regular clothes and may be moved into position to supply warm water for washing and warm water for rinsing with high agitator and spin speeds for non-color fast clothes.

It may also be moved into position to supply warm water for washing and cold water for rinsing with low agitator and spin speeds for the washing of color fast synthetic fabrics and to supply cold water for washing and for rinsing with low agitator and spin speeds for non-color fast synthetic fabrics. It may further be moved into position to supply cold water for washing and rinsing with a low agitator speed and a high spin speed for special fabrics such as woolens and silks, all by the operation of a single knob (not shown) turning the shaft 95 to the selected position as indicated by suitable indicia (not shown) cooperating with indicia (not shown) on the knob.

In the modified form of valve for carrying out the invention illustrated in FIGURES 8 through 12, I have shown a selector unit 130 with individual wash and rinse temperature selectors, which may be supplied with fluid such as air under pressure from the wash rinse timer valve 12. Individual speed selectors (not shown) may also be provided to control the agitator and spin speeds.

As shown in FIGURES 8 and 9, the temperature selector unit 130 comprises a valve block 131 and an abutting valve block 132. The valve blocks 131 and 132 may have fluid communication with each other and may be sealed along their abutting faces, as will hereinafter be more clearly described as the specification proceeds. Machine screws 133 are provided to secure the valve blocks in abutting relation with respect to each other.

The valve block 131 has a fluid pressure or air inlet port 135 leading thereinto and corresponding with the inlet port 21 of the program selector valve 23 shown in FIGURE 1. The inlet port 135 extends within the valve body and opens to an upper face 136 thereof. The valve block 131 also has an outlet port 137 leading from a side wall thereof at right angles to the inlet port 135. The outlet port 137 corresponds to the outlet port 43 of the program selector 23.

The valve block 132 has an inlet port 139 leading thereinto and shown in FIGURE 8 as being on the opposite end of the program selector unit 130 from the inlet port 135 and as leading horizontally into the valve block 132 and opening to a top face 140 thereof.

The inlet port 139 corresponds to the inlet port 26 of the program selector valve 23. The valve block 132 also has an outlet port 141 leading therefrom and shown as leading from the opposite face thereof from the outlet port 137 and corresponding with the air pressure line 51.

As shown in FIGURE 8 the port or passageway 135 opens through an annular collar 140, extending upwardly from the face 136 and having a port 141 leading axially therethrough, accommodating air under pressure to be confined by a cup-like diverter valve 143. The valve 143 is shown as being pivotally mounted on the collar 140 and as having an upwardly extending stem or shaft 144 extending upwardly through a cover 145 for the valve blocks 131 and 132. A compression spring 146 interposed between the bottom of the cover 145 and a washer 147 biases the valve 143 into sealing engagement with the face 136.

A port 150 corresponding to the port 43 in the valve block 22 also leads inwardly of the face of the valve block.

A port 150 corresponding to the port 43 in the valve block 22 also leads inwardly of the face of the valve block.

When the diverter valve is in the position shown in FIGURE 9, the ports 149 and 150 are each connected with air under pressure through the inlet 135. The diverter valve 143 may, however, be pivoted in one direction or another to vent either of the ports 149 or 150 to atmosphere.

In a like manner the inlet port or passageway 139 leads upwardly along a collar 151 and supplies air under pressure to a cup-like diverter valve 153 through radial passageways 154 leading radially through the collar 151. The diverter valve 153 is biased into sealing engagement with the face 140 of the valve block 132 by a spring 155, interposed between the undersurface of the collar 145 and a washer 156 mounted on the diverter valve. The diverter valve 153 has a shaft 157 extending upwardly therefrom through the cover 145, to accommodate positioning of said valve to supply air under pressure to a port 159 corresponding to the port 53 of the program selector valve 23, or through a port 160 corresponding to the port 64 of the program selector valve 23.

When the diverter valve 153 is in the position shown in FIGURE 9 and the wash rinse valve 12 is in the wash position shown in FIGURE 1, the ports 159 and 160 will both be vented to atmosphere. As the wash rinse valve 12 moves to its rinse position, the ports 159 and 160 will be supplied with fluid or air under pressure through the inlet port 139 and the program selector valve 12. The diverter valve 153 may be rotatably moved by the shaft 157 to vent either of the ports 159 or 160 to atmosphere at the selection of the operator of the machine.

During the wash fill period of the washing cycle, air under pressure will enter the inlet port 135 and supply fluid under pressure to the ports 149 and 150. The port 149, however, will be vented to atmosphere through the wash rinse valve 12. The ports 159 and 160 will also be vented to atmosphere through the wash rinse valve 12.

The port 150 is shown in FIGURE 10 as having communication with three spaced horizontally extending passageways 161, 162 and 163 opening to the valve body or block 140 and sealed by diaphragms 165 and 166.

The port 159 also opens to three horizontally extending passageways 169, 170 and 171. The passageways 169, 170 and 171 open to the valve block or body 131, the passageway 169 being between the passageways 161 and 162 and the passageways 170 and 171 being between the passageway 163.

Thus, pressure in the passageways 161 and 162 will seat the diaphragm 165 on the end of the passageway 169 to close the vent passageway 169, while pressure in the passageway 161 will move the diaphragm 166 against its bias position shown to accommodate air under pressure to flow through a passageway 172 and out the passageway 137, which corresponds to the passageway 45 shown in FIGURE 1 and serves to operate the fluid pressure operated operator 36, to supply hot water through the discharge outlet 37 from the mixing valve 13.

As the wash rinse valve 12 moves to its rinse position, the diaphragm 165 will be moved by air under pressure in the passageway 169, to accommodate air to flow through the outlet passageway 172, while air under pressure in the passageways 170 and 171 will seat the diaphragm 166 on the end of the passageway 163. Air under pressure will then enter the outlet port 137.

In a like manner fluid or air under pressure entering the port 149 will enter three spaced passageways 173, 174 and 175 opening to diaphragm valves 176 and 177. Three spaced passageways 179, 180 and 181 between the passageways 173, 174 and 175 and communicating with the port 160 are also provided. When the diverter valve 153 is in the position shown in FIGURE 9, the spaced passageways 179, 180 and 181 will be vented to atmosphere through the port 160. Air under pressure in the passageways 174 and 175 will seat the diaphragm valve 177 on the end of the passageways 181, while air under pressure in the passageway 173 will pass by the diaphragm valve 176 and out the outlet passageway 141, corresponding to the passageway 15 shown in FIGURE 1, to operate the operator 35 to supply cold water to mix with the hot water, resulting in a warm wash water.

It may be seen from the foregoing that the valves just described operate like the program selector valve 23 and accommodate individual adjustment of the various valves into the desired position and also assure the venting of the required fluid operated operator where the valve has once been set in an operative position and it is desired to change the program during the washing and rinsing operation, and thereby prevent the locking of either fluid operated operator in the position to which the operators were first moved due to an initial setting of the program selector valves.

While the system of the invention may be operated by vacuum as well as by air or any other fluid under pressure, the system and valves have herein been described as a pressure system for illustrative purposes, and applicant does not desire to be construed as limiting himself to a pressure system.

It should be understood that various variations and modifications of the invention herein shown and described may be effected without departing from the spirit and scope of the novel concepts of the present invention as defined by the claims appended hereto.

I claim as my invention:

1. In a program selector valve adapted to preselect a program of operation of a plurality of pneumatic motors and the like, a valve block, separate inlets leading into said valve block, said inlets being alternately operable to supply pressure to said valve block and to vent air therefrom, a three position first valve in association with one inlet, a three position second valve in association with said other inlet, two outlet ports leading from said first valve, two outlet ports leading from said second valve, said first and second valves being positionable to connect two outlet ports to an associated inlet and to vent either outlet port to atmosphere, fluid connections between one outlet port for each valve, fluid connections between the other outlet port for each valve, common outlets from each fluid connection, and pressure operated valve means in each fluid connection controlling the flow of fluid under pressure from one outlet port in accordance with the differential in pressure across said outlet port and venting each outlet port to atmosphere upon the selection of a different program during the carrying out of a preselected program and thereby accommodating the changing of a selected program at any time during the carrying out of a preselected program.

2. In a program selector valve adapted to preselect a program of operation of a series of pneumatic motors and the like, a valve block having two block portions having abutting faces maintained in abutting engagement with each other, a separate inlet leading into each block portion of said valve block, a separate outlet leading from each block portion of said valve block, a separate three position valve in association with each block portion of said valve block and in fluid communication with the associated inlets into said block portions, two outlet ports in each block portion of said valve block in fluid communication with said inlets through the associated valves, individual fluid connections leading from the outlet ports in each block portion of said valve block leading to the abutting faces of said block portions, and pressure operated diaphragm valves in said fluid connections at the abutting faces of said block portions of said valve block and sealing the block portions of said valve block and controlling the flow of fluid under pressure from the selected outlet port in each block portion through the associated outlet in accordance with the differential in pressure across the associated outlet ports in each block portion of said valve block.

3. In a program selector valve adapted to preselect a program of operation of a series of pneumatic motors and the like, a valve block having two block portions having abutting faces maintained in abutting engagement with each other, an individual inlet leading into each block portion of said valve block and opening through a plane face of an associated half portion of said valve block, an individual three position shear valve maintained in sealing engagement with an associated plane face of said valve block and extending over the associated inlet opening through said plane face, two outlet ports in association with each shear valve and leading from said plane faces into said block portions of said valve block, spaced outlet passageways leading from each outlet port in one portion of said valve block to the other block portion of said valve block and being aligned with the outlet passageways in the other block portion of said valve block, an outlet passageway in each block portion of said valve block in fluid communication with the associated outlet, and means sealing the abutting faces of said block portions of said valve block and affording communication between the outlet passageways in each block portion of said valve block, connecting one set of outlet passageways in each block portion of said valve block with said outlet leading from one block portion of said valve block and connecting the other set of outlets in each block portion of said valve block with said outlet leading from the other block portion of said valve block, comprising pressure operated diaphragm valves sealed at their margins to the abutting faces of the block portions of said valve block and controlling the flow of fluid under pressure from one outlet passageway in one block portion of said valve block in accordance with the differential in pressure across said outlet passageways in each block portion of said valve block.

4. In a pneumatic program selector valve, a valve block having at least two inlets leading thereinto and at least two outlets leading therefrom, a first valve in association with one inlet, a second valve in association with the other inlet, two outlet ports leading from said first valve, two outlet ports leading from said second valve, said first and second valves each being positionable to connect an associated inlet with both outlet ports and to connect the associated inlet to one outlet port and to vent the other associated outlet port to atmosphere, fluid connections between a first outlet port of each valve to one of said outlets leading from said valve body, fluid connections between a second outlet port of each valve to said other outlet leading from said valve body, and pressure operated valve means in said fluid connections between the first outlet ports of said first and second valves and in said fluid connections between said second outlet ports of said first and second valves controlling the flow of fluid under pressure from one outlet port and through a selected outlet from said valve body in accordance with the differential in pressure across said outlet ports and venting said outlet port to atmosphere upon a change in position of the valves.

References Cited in the file of this patent

UNITED STATES PATENTS

| 1,675,231 | Stoke | June 26, 1928 |
| 1,849,283 | Crane | Mar. 15, 1932 |
| 2,217,783 | Bell | Oct. 15, 1940 |
| 2,530,622 | Maris | Nov. 21, 1950 |
| 2,567,428 | Greeley | Sept. 11, 1951 |
| 2,607,207 | Branson | Aug. 19, 1952 |
| 2,704,131 | Vahs | Mar. 15, 1955 |
| 2,822,823 | Klein et al. | Feb. 11, 1958 |